Patented Apr. 23, 1929.

1,709,999

UNITED STATES PATENT OFFICE.

WILLIAM J. O'BRIEN, OF BALTIMORE, MARYLAND.

METHOD OF PRODUCING LITHOPONE.

No Drawing.   Application filed May 9, 1928.   Serial No. 276,511.

The present invention relates to a method of producing an improved lithopone.

As is well known, in the production of ordinary commercial lithopone, a solution of zinc sulfate $ZnSO_4$ and barium sulfide $BaS$ are employed to form zinc sulfide $ZnS$ and barium sulfate $BaSO_4$ which constitutes lithopone. The product thus obtained is treated in accordance with the well known practice in the art such as filtering, washing, pressing, drying and grinding to produce the finished lithopone.

I am aware of the fact that attempts have heretofore been made to improve the character of lithopone. For instance, ultramarine has been added to the same to improve its color. Phosphates or alkaline earths have been added to increase its light resistance.

As more fully set forth in my prior Patents Nos. 1,600,772 and 1,600,773 it has been found that lithopone may be greatly improved in its spreading quality by adding a titanium compound thereto such as titanium oxide $TiO_2$.

Some of the methods of adding the titanium oxide to the lithopone are briefly as follows:

(1) The dry powdered lithopone may be mixed with the dry powdered titanium oxide and the resultant product used in the same manner as the ordinary lithopone would be used generally in the art. Some of the uses to which lithopone is now put is as a filler in the manufacture of linoleum, as a pigment in paints and in the mixing of rubber before calendering.

(2) As more fully set forth in the above mentioned patents a suspension of titanium oxide $TiO_2$ may be added to a suspension of lithopone and after mixing the resultant product may be filtered, pressed and subjected to the other usual steps to form the finished lithopone.

The present invention involves the following procedure. To a solution of titanium sulfate in sulphuric acid, which solution has been freed in any ordinary manner from iron and other impurities and which contains an excess of sulfuric acid, is added zinc oxide sufficient to neutralize the free sulfuric acid and still leave an excess of zinc oxide sufficient to neutralize the sulfuric acid set free from the hydrolysis of the titanium sulfate, in water, as illustrated in the equations below. The function of the addition of the zinc oxide is to neutralize the free sulfuric acid and to hydrolyze the titanium sulfate forming additional zinc sulfate from the titanium sulfate. The reaction may be represented by the following equations.

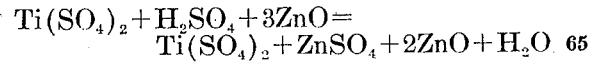
$$Ti(SO_4)_2 + H_2SO_4 + 3ZnO = \\ Ti(SO_4)_2 + ZnSO_4 + 2ZnO + H_2O$$

The zinc oxide in excess to what was required to neutralize the free sulfuric acid, is present in sufficient amount to neutralize the sulfuric acid set free in the hydrolysis of the titanium sulfate, according to the following equations:

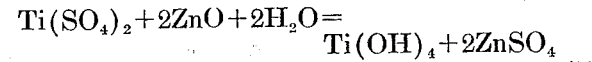
$$Ti(SO_4)_2 + 2ZnO + 2H_2O = \\ Ti(OH)_4 + 2ZnSO_4$$

The resultant mixture containing titanium hydroxide and zinc sulfate is treated with sufficient barium sulfide solution to completely precipitate the zinc as zinc sulfide, according to the following reaction:

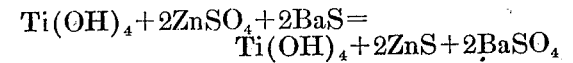
$$Ti(OH)_4 + 2ZnSO_4 + 2BaS = \\ Ti(OH)_4 + 2ZnS + 2BaSO_4$$

The resultant precipitate consists of a homogeneous mixture of titanium hydroxide, zinc sulfide and barium sulfate, the proportions of which can be varied at will, by varying the amount of zinc sulfate present. The precipitate thus obtained is filter pressed, dried, muffled, and quenched in water. The effect of muffling is to drive off the water from the titanium hydroxide, leaving titanium oxide. This reaction is represented by the following equation:

$$BaSO_4 \cdot ZnS \cdot Ti(OH)_4 + Heat = \\ BaSO_4 \cdot ZnS \cdot TiO_2 + H_2O$$

The product thus obtained, after the subjection to high temperature, is ground wet, washed, filter pressed, dried and ground, and is otherwise treated for producing lithopone.

I have found that satisfactory results are obtained by having the titanium oxide present in the final product in from 1 to 25 per cent by weight. To produce finished lithopone containing 7.5 per cent by weight of titanium oxide, the following ingredients are employed in the proportions stated:

|  | Pounds. |
|---|---|
| Titanium sulfate | 240 |
| Zinc oxide | 162 |
| Barium sulfide | 508 |
| Zinc sulfate | 161 |

It has been found that the above ingredients in the amounts given will produce approximately 1000 pounds of lithopone containing approximately 7.5 per cent titanium oxide.

I may also use zinc carbonate ($ZnCO_3$) in the place of the zinc oxide. The zinc carbonate is added in sufficient amounts to neutralize the free sulphuric acid and still leave an excess of zinc carbonate sufficient to neutralize the sulphuric acid set free from the hydrolysis of the titanium sulphate, in water. I also contemplate the use of metallic zinc, in the place of the zinc oxide. When using metallic zinc, it is employed in a sufficient amount to neutralize the free sulphuric acid, and this is preferably followed by the use of a sufficient amount of zinc oxide or zinc carbonate to neutralize the sulphuric acid set free from the hydrolysis of the titanium sulphate, in water.

Whether zinc oxide, zinc carbonate, or metallic zinc is used, zinc sulphate will be formed in each case, which will take part in the reaction.

Having thus described my invention, I claim:—

1. The herein described method of producing an improved lithopone pigment, comprising the steps of neutralizing a solution containing titanium sulfate and free sulfuric acid by zinc oxide in excess to the amount required to neutralize the free sulfuric acid, combining the resultant mass with barium sulfide to form lithopone and titanium hydroxide, and treating the mass to produce finished lithopone and convert the titanium hydroxide into titanium oxide.

2. The herein described method of producing an improved lithopone pigment, comprising the steps of neutralizing a solution containing titanium sulfate and free sulfuric acid by zinc oxide in excess to the amount required to neutralize the free sulfuric acid, combining the resultant mass with barium sulfide, heating the mass, and subsequently treating it to produce finished lithopone containing titanium oxide.

In testimony whereof I affix my signature.

WILLIAM J. O'BRIEN.